US006427035B1

(12) United States Patent
Mahony

(10) Patent No.: US 6,427,035 B1
(45) Date of Patent: Jul. 30, 2002

(54) METHOD AND APPARATUS FOR DEPLOYING FIBER OPTIC CABLE TO SUBSCRIBER

(75) Inventor: Glenn M. Mahony, Alpharetta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/372,675

(22) Filed: Aug. 12, 1999

(51) Int. Cl.⁷ .................................................. G02B 6/28
(52) U.S. Cl. .......................................... 385/15; 385/24
(58) Field of Search ................. 385/15, 24; 359/123, 359/124, 115, 125, 167, 118, 121, 137

(56) References Cited

U.S. PATENT DOCUMENTS

| | | | |
|---|---|---|---|
| 5,325,223 A | 6/1994 | Bears | 359/137 |
| 5,349,457 A | 9/1994 | Bears | 359/118 |
| 5,375,185 A | 12/1994 | Hermsen et al. | 385/135 |
| 5,553,183 A | 9/1996 | Bechamps | 385/95 |
| 5,668,652 A | 9/1997 | Hashomoto et al. | 359/125 |
| 5,729,370 A | 3/1998 | Bernstein et al. | 359/118 |
| 5,778,132 A | 7/1998 | Csipkes et al. | 385/135 |
| 5,880,865 A | 3/1999 | Lu et al. | 359/125 |
| 5,937,117 A | 8/1999 | Ishida et al. | 385/24 |
| 5,971,624 A | 10/1999 | Giebel et al. | 385/59 |
| 6,137,604 A | 10/2000 | Bergano | 359/124 |
| 6,295,148 B1 | 9/2001 | Atlas | 359/125 |
| 6,304,639 B1 | 10/2001 | Malomsoky et al. | 379/112.04 |
| 6,307,839 B1 | 10/2001 | Gerszberg et al. | 370/235 |
| 6,335,936 B1 | 1/2002 | Bossemeyer, Jr. et al. | 370/420 |
| 6,336,201 B1 | 1/2002 | Geile et al. | 714/755 |

Primary Examiner—Brian Sircus
Assistant Examiner—Michael C. Zarroli
(74) Attorney, Agent, or Firm—Shaw Pittman LLP

(57) ABSTRACT

A fiber optic deployment network that delivers uninterrupted fiber optic service from a service provider central office to a subscriber's optical network terminal, and as a component of that deployment network, a fiber optic deployment apparatus and method for deploying multiple fiber optic drops from an incoming fiber optic strand spliced from a single fiber optic strand. The deployment apparatus providing splitting and terminating functions in a combined splitter-terminal package thereby simplifying installation of the fiber optic deployment. The splitter-terminal package having a splice case, a splitter and connectorized terminations for connecting and incoming fiber optic strand, splitting the incoming fiber optic stand into a number of outgoing strands and terminating the outgoing strands at connectorized terminations. The splice case separates an incoming fiber optic strand from a primary fiber optic strand, the incoming fiber optic strand connects to the incoming side of the splitter-terminal package, the outgoing side of the splitter-terminal package connects to the fiber optic drops, and the fiber optic drops proceed to the subscriber premises. The fiber optic drops are thereby connector fitted providing continuous fiber optic service throughout the network.

15 Claims, 11 Drawing Sheets

METHOD AND APPARATUS FOR DEPLOYING FIBER OPTIC CABLE TO SUBSCRIBER

DEFINITIONS

The following definitions and descriptions are provided to clearly define certain terms used throughout this application. As used herein, these terms are intended to have the meanings set forth below.

1. Primary fiber optic strand—a fiber optic strand that is connected to an electronic device in the central office of a service provider. A primary fiber optic strand supports a single fiber optic electronic device in the central office and up to 32 different fiber optic electronic devices external to the central office, i.e., one fiber optic strand can be split into 32 different strands for connection to 32 different fiber optic electronic devices.

2. Fiber optic cable—a cable that contains a multiple number of fiber optic strands.

3. Distribution splitter—a splitter used in the intermediate portion of a deployment network, where fiber optic strands are separated and directed to different locations. Distribution splitters divide a single fiber optic strand into multiple numbers of strands.

The number of splitters in a network depends on the total number of strands in the fiber optic cable leading into a central office. The total number of strands in the cable is at least equal to the number of fiber optic electronic devices connected at the central office.

For purposes of describing the present invention, it is understood that, although only two levels of splitting are described herein, any number of levels could be used to divide a primary fiber optic strand into multiple strands. In fact, instead of using distribution splitters and local terminals, a single primary fiber optic strand could go directly to a local terminal with a 1×32 splitter, in which case the local terminal splits the strand into 32 separate strands which may be connected to 32 individual fiber optic drops leading to one or more subscriber premises.

4. Secondary fiber optic strand—the strands that are separated from a primary fiber optic strand. When a primary fiber optic strand goes through a first distribution splitter, the separated strands are referred to as secondary fiber optic strands. The number of secondary fiber optic strands in the network depends upon the configuration of the splitter, e.g., a 1×8 splitter would split a primary fiber optic strand into eight secondary fiber optic strands. Through each set of splitters, the number of fiber optic electronic devices supported becomes progressively smaller until there is only one device per strand.

5. Splice case or splicer—case that attaches to a fiber optic cable and separates one or more fiber optic strands from the cable to be diverted away from the cable in a different direction. A splice case contains fiber optic splices or permanent connections between two fiber optic strands.

6. Local terminal—an outside plant cable terminal used in the prior art for terminating one or more fiber optic strands near one or more subscriber premises for connection to copper wire drops into each subscriber premises. Under the current invention, local terminal comprises a splitter-terminal apparatus that splits a final fiber optic strand into multiple strands each fitted with a connectorized termination for joining one fiber optic drop.

7. Fiber optic drops—small fiber optic cables that contain one or two fiber optic strands connecting the local terminal to the customer location. The fiber optic drops connect to the individual fiber optic electronic devices at the customer location.

8. Connectorized termination—a fitting for a fiber optic cable or strand that facilitates quick connections between two different cables or strands. The fittings are typically snap-on plastic connectors with a male and female side, e.g., SC connectors.

9. Pigtail—a short length of jacketed fiber optic strand permanently fixed to a component at one end and a connectorized termination at the other end, such that the pigtail provides a flexible fiber optic connection between the component and the connectorized termination.

BACKGROUND

1. Field of the Invention

The present invention relates to fiber optic cable systems and, more specifically, to a fiber optic deployment system and apparatus for providing a continuous, uninterrupted fiber optic service from a service provider central office to subscriber premises.

2. Background of the Invention

It is well known in the art that using fiber optic cabling and transmission means in a network provides many advantages over other cabling and transmission systems. Fiber optic systems provide significantly higher bandwidth and greater performance and reliability than standard copper-wired systems. For example, fiber optic systems can transmit up to 10 gigabits per second (Gbps) in comparison to copper lines, which transmit at typically less than 64 kilobits per second (Kbps). Optical fibers also require fewer repeaters over a given distance than copper wire does to keep a signal from deteriorating. Optical fibers are immune to electromagnetic interference (from lightning, nearby electric motors, and similar sources) and to crosstalk from adjoining wires. Additionally, cables of optical fibers can be made smaller and lighter than conventional cables using copper wires or coaxial tubes, yet they can carry much more information, making them useful for transmitting large amounts of data between computers and for carrying bandwidth-intensive television pictures or many simultaneous telephone conversations. However, implementation of complete fiber optic networks from a service provider directly to subscriber premises, e.g., fiber to the home (FTTH), has been very slow due to the high installation cost.

Instead of implementing FTTH networks, service providers have developed strategies to provide some of the benefits of fiber optic networks without actually deploying fiber all the way to the home (or other end-subscriber locations). One such strategy is known as fiber to the curb (FTTC) where fiber optics are used between the service provider and local terminals (also referred to as outside plant cable terminals) which are situated in areas having a high concentration of subscribers. The last leg of the network, i.e., from the local terminals into a subscriber premises is made using copper wire drops. Such FTTC systems provide the benefits of fiber optic systems, described above, as far as the fiber extends, but deprives the subscriber of the full benefit of fiber optic networks because of the limiting copper wiring. The only way to gain the full benefit of fiber optic networking is to use a continuous, complete fiber optic connection from the service provider's equipment to the subscriber's equipment.

As noted earlier, copper wire drops are used because of the prohibitively high cost of installing fiber optic drops using conventional systems and methods. The bulk of these costs can be attributed mainly to the highly skilled labor and time required to install fiber optic splitters and to join fiber optic drops to fiber optic strands coming from the splitters. In conventional systems and methods, fiber optic networks use fiber optic splitters and splice cases to route fiber optic strands throughout a distribution network. The fiber optic splitters and splice cases allow a fiber optic strand to branch into multiple strands widening the network's coverage area. In conventional networks, design engineers use splitters and splice cases to route strands from electronic devices at the central office to distribution locations, such as those in housing developments.

From the distribution locations, individual fiber optic drops into each subscriber's premises must be manually spliced onto each strand. Alternatively, each time a new subscriber requires fiber optic service, one of the fiber optic strands could be manually fitted with a connector for joining a fiber optic drop to the new subscriber's premises. Thus using the convention systems and methods, installation of individual fiber optic drops to every subscriber's premises is time-consuming and expensive. As discussed above, to overcome the high installation costs in conventional networks, the fiber optic strands from the distribution locations are run to electronic devices located in local terminals, e.g., aerial or buried terminals, situated in the center of a cluster of subscriber houses. The fiber optic service ends at these electronic devices and copper wire drops complete the connection to the subscriber premises. The copper wire drops are used because no device exists in the prior art that facilitates an economical, easy-to-connect fiber optic drop to the subscriber premises. Although the prior art includes fiber optic splitters and splices for network deployment, the existing splitters and splices are not appropriate for installing individual drops to subscribers because they do not provide a terminating function and they are not combined into an easy to deploy unit.

Further, the conventional fiber optic splitter apparatus present difficulties with ease of connection. The fiber optic splitters known in the prior art are designed to accommodate permanent connections. The splitters are installed at network branch locations at which the number and structure of incoming and outgoing strands rarely change.

SUMMARY OF THE INVENTION

The present invention is a fiber optic network deployment system and apparatus for deploying fiber optic strands from a service provider's central office to individual subscribers' premises. As shown schematically in FIG. 1a, the invention comprises a central office fiber optic electronic device, a primary fiber optic cable (or strand), distribution splitters, secondary fiber optic cables (or strands), local terminals (outside plant cable terminals), fiber optic drops, and subscriber fiber optic electronic equipment located on subscriber premises. The present invention enables economically feasible deployment of complete, uninterrupted fiber optic services to individual subscribers. The fiber optic deployment system includes local terminals comprising fiber optic splitter-terminal apparatus that enable the cost-effective installation of fiber optic drops to each subscriber.

Fiber Optic Network Deployment System

As shown in FIG. 1a, the system components are connected in a branched network. Starting from the service provider's central office, a primary fiber optic strand is routed to a distribution splitter that divides the primary fiber optic strand into multiple secondary fiber optic strands, forming a secondary fiber optic cable. As the secondary fiber optic cable extends through the network, secondary fiber optic strands from the cable are spliced off and directed to local terminals within service areas. The local terminals comprise a novel fiber optic splitter-terminal apparatus, described below, to further split the secondary fiber optic strands into individual fiber optic drops routed from these splitter-terminals to the subscriber premises. Once inside the subscriber premises, the fiber optic drops are connected to a subscriber fiber optic electronic device, such as an optical network terminal. The result is complete, uninterrupted fiber optic service from the central office to the subscriber's electronic equipment which can serve various subscriber electronic devices (e.g., personal computer, television, telephone).

The above-described fiber optic network deployment system can support data, analog video, and voice transmission, with each configuration requiring different equipment at the service provider central office. The preferred embodiment of the deployment system eliminates the use of active components (e.g., remote terminal sites containing multiplexers, host digital terminals, digital loop carrier systems, and other electronic equipment) throughout the distribution network. The only active components are found at the ends of the network, in the service providers' central office electronic equipment and the electronic equipment located in subscriber' premises. The resulting passive optical network greatly reduces the probability of trouble reports and decreases the cost of provisioning, maintaining and repairing the system.

FIG. 1b illustrates a fiber optic deployment within a community of subscribers. The primary fiber optic cable from the central office enters the community at three hub locations. At these locations, the primary strands are split and diverted to individual branches. Along the branches, a multiple number of terminals are present. Each terminal location along these branches indicates the number of drops leading to individual fiber optic electronic devices at subscriber locations.

In the present invention, local terminal comprise a specialized splitter-terminal to connect incoming fiber optic strands to fiber optic drops, thereby providing complete, uninterrupted fiber optic service. The splitter-terminal replaces the conventional fiber-to-copper interface and provides a fiber optic connector interface between a fiber optic strand and multiple fiber optic drops to subscriber premises.

Fiber Optic Network Deployment Apparatus

A fiber optic network deployment apparatus, also referred to as "splitter-terminal apparatus" herein, combines into a single inexpensive apparatus a means for splitting and terminating a fiber optic strand for deployment to a cluster of subscriber premises. The splitter-terminal provides easily accessible, easily connectable terminations from which to run fiber optic drops to subscriber premises. Further, the splitter-terminal apparatus provides strain relief for the delicate fiber optic strands being split or being joined to the fiber optic drops. Finally, as described below, the splitter-terminal apparatus can be modified to accommodate aerial and buried deployment applications.

As shown in FIGS. 2a and 2b, a preferred embodiment of the splitter-terminal includes a splitter, a housing, and a plurality of connectorized terminations, which together make up a splitter-terminal package. An incoming fiber optic strand connects to the splitter. The splitter divides the fiber optic strand into a plurality of fiber optic strands extending from the splitter to the connectorized terminations.

The incoming fiber optic strand connects to the splitter through an incoming connectorized termination, e.g., a SC or ST connector. The connectorized termination is attached to the housing of the splitter-terminal package. In another embodiment of the present invention, shown in FIGS. 2c and 2d, the splitter-terminal package includes a pigtail permanently connected to the splitter. In this embodiment, the free end of the pigtail is fitted with a connectorized termination for easily connecting the incoming fiber optic strand. This pigtail extends through the wall of the housing so that the internal splitter-terminal components remain protected by the housing.

Using connectorized terminations allows service providers to field-install the splitter-terminal packages without the need for fiber optic splicing in field. Pigtails are more suited for manufactured assemblies, where an entire splitter-terminal package is delivered to the field.

As illustrated in FIGS. 4a–6c, further embodiments of the present invention use the splitter-terminal package in a larger deployment system, e.g., aerial or buried deployment systems. These larger deployment systems include a splice case and fiber optic drops, in addition to the splitter-terminal package. The splice case connects to a secondary fiber optic cable and separates a secondary fiber optic strand from the bundle. The separated strand becomes the incoming fiber optic strand connected to the incoming side of the splitter-terminal package.

On the outgoing side of the splitter-terminal package, the outgoing connectorized terminations connect to fiber optic drops. Each fiber optic drop proceeds to a subscriber premises for connection to a subscriber fiber optic electronic device such as an optical network terminal. Thus, continuous, uninterrupted fiber optic service is delivered all the way to the subscriber premises serving subscriber electronic devices (e.g., television, telephone, personal computer). This fiber optic network deployment system eliminates the inferior copper drop connections prevalent in the prior art.

The connectorized terminations provide an easy, economical way to connect and disconnect fiber optic drops without the necessity of performing fiber optic cable splicing operations. This advantage affords service providers with greater flexibility in accommodating changes and additions to existing fiber optic networks. For example, connectorized terminations easily accommodate new subscribers, as is often the case in a new housing development. Similarly, in the event that a fiber optic drop to the subscriber is damaged, the service provider can abandon the existing drop and opt for the more cost-effective repair of installing a new fiber optic drop from the fiber optic splitter to the subscriber premises.

Aerial deployment systems arrange the splice case, splitter-terminal package, and fiber optic drops in a variety of configurations. Two examples are pole-mounted systems and strand-mounted systems, shown in FIGS. 4a–4b and 5, respectively.

In a pole-mounted system, the splice case is attached to the secondary fiber optic cable, the splitter-terminal package is mounted on the pole, the incoming fiber optic strand runs from the splice case to the splitter-terminal package, and fiber optic drops connected to the outgoing side of the splitter-terminal package run from the pole to the subscriber premises.

In a strand-mounted system, both the splice case and the splitter-terminal package are mounted inside a splice case housing that is lashed with wire to a secondary fiber optic cable. The splice case splices off the incoming fiber optic strand that runs from the splice case to the splitter-terminal. The fiber optic drops connected to the outgoing side of the splitter-terminal package run from the strand-mounted splice case housing directly to the subscriber premises.

Buried deployment systems mount the splitter-terminal package and splice case in a pedestal shell that rests on the ground. As shown in FIG. 6a, a secondary fiber optic cable enters and exits the pedestal shell from the pedestal shell bottom. The splice case connects to the secondary fiber optic cable and splices off an incoming fiber optic strand that runs from the splice case to the splitter-terminal package. The fiber optic drops connected to the outgoing side of the splitter-terminal exit the pedestal through the pedestal shell bottom and proceed underground to the subscriber premises.

As shown in FIG. 6b, in another embodiment of the buried deployment system, the splice case resides underground with a secondary fiber optic cable, as opposed to being contained in the pedestal shell.

In each of the above-described deployment systems, the incoming fiber optic strand running from the splice case to the splitter-terminal package can be connectorized or spliced. The use of either spliced or connectorized terminations for the splice case and incoming side of the splitter-terminal package depends upon the service provider's intended method of installation. If the service provider desires more factory pre-assembly, the incoming fiber optic strand would be spliced to the splice case and splitter-terminal package at the factory and delivered as a preconnected unit. If field assembly were desired, service providers would manufacture the splice case and incoming side of the splitter-terminal package with connectorized terminations so that the components could be connected in the field. This would also allow customizing of the length of the incoming fiber optic strand to accommodate field requirements.

Objects of the Invention

Accordingly, it is an object of the present invention to provide a fiber optic network that delivers uninterrupted fiber optic service from a central office to subscriber premises.

It is another object of the present invention to provide an inexpensive apparatus that splits and terminates a fiber optic strand for delivery through fiber optic drops to individual subscribers.

It is another object of the present invention to provide a fiber optic network deployment system that deploys fiber optic strands in a network architecture that maximizes connected subscribers and minimizes the lengths of the strands and the number of active components.

These and other objects of the present invention are described in greater detail in the detailed description of the invention, the appended drawings, and the attached claims.

DESCRIPTION OF THE DRAWINGS

FIG. 2b is a schematic diagram of a splitter-terminal package with a 1×4 splitter and a pig tail for the incoming fiber optic strand.

DETAILED DESCRIPTION OF THE INVENTION

Figure 1A:
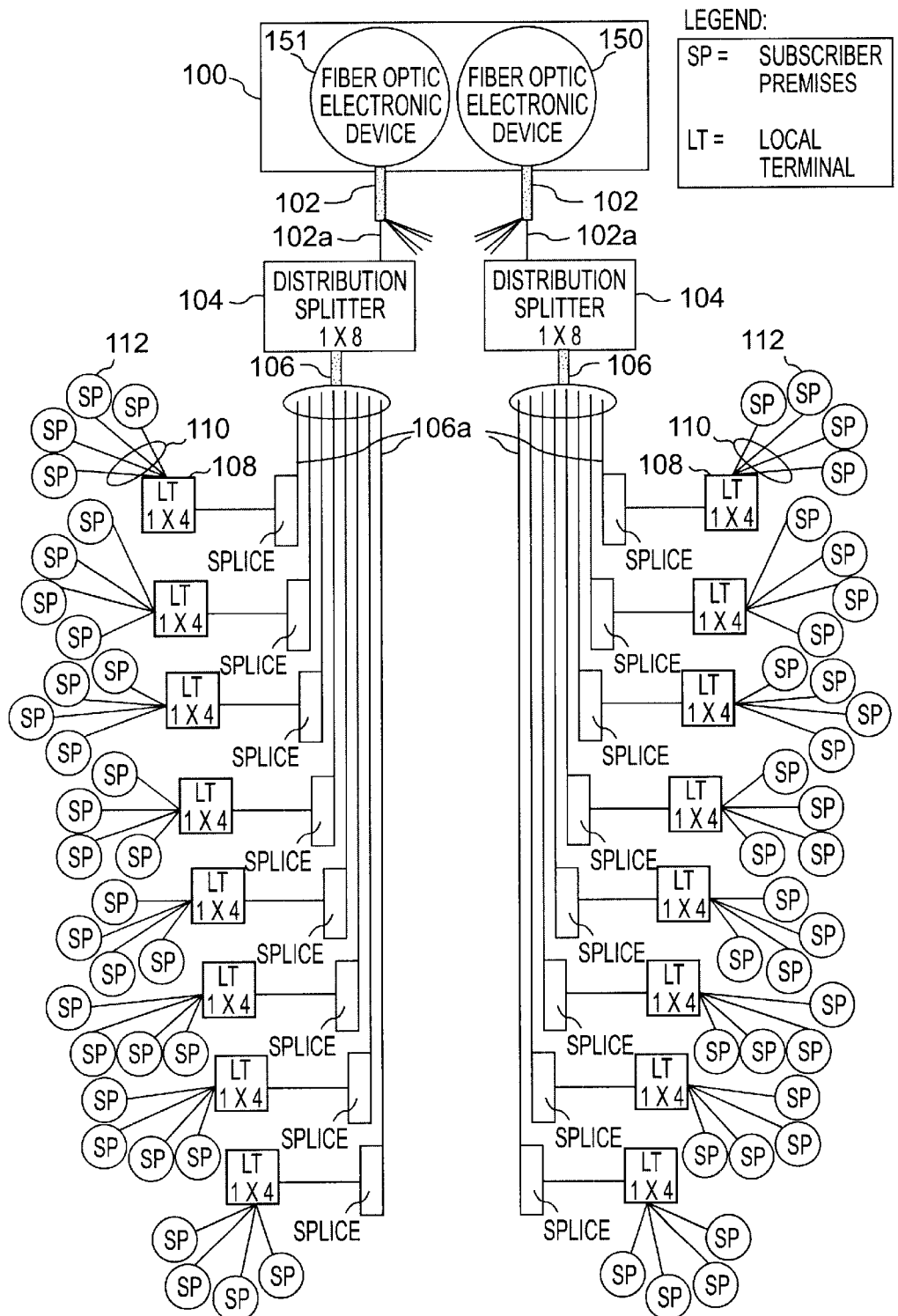
FIG. 1a is a schematic diagram of a fiber optic network from a central office to subscriber premises.

As shown in FIG. 1a, the preferred embodiment of the present invention comprises a central office 100, a primary fiber optic cable 102 having a plurality of primary fiber optic strands 102a, a plurality of distribution splitters 104, a plurality of secondary fiber optic cables 106 having a plurality of secondary fiber optic strands 106a, a plurality of local terminals 108 (outside plant cable terminals), each comprising a fiber optic splitter-terminal apparatus (not shown), a plurality of fiber optic drops 110, and a plurality of subscriber premises electronic equipment 112.

The system components are connected in a branched network. Starting from the central office 100, primary fiber optic cables 102 are extended from the service provider to locations throughout the network. At various points in the network, primary fiber optic strands 102a are spliced into a plurality of distribution splitters 104. Each distribution splitter 104 divides a primary fiber optic strand 102a into a secondary fiber optic cable 106. As secondary fiber optic cable 106 passes near clusters of subscribers, secondary fiber optic strands 106a are spliced off with splice cases and are directed toward the respective service areas. The number of secondary fiber optic strands 106a in cable 106 supported by primary strand 102a depends on the configuration of distribution splitter 104. For example, a 1×8 distribution splitter splits a primary fiber optic strand into eight secondary fiber optic strands 106a. Each of the eight secondary fiber optic strands 106a accommodates four electronic devices for a total of thirty-two supported end devices per primary fiber optic strand 102a.

Within a service area, each secondary fiber optic strand 106a goes to a local terminal 108. As noted earlier, local terminals 108 comprising the splitter-terminal apparatus further splitting secondary fiber optic strand 106a into a plurality of fiber optic drops 110. Each fiber optic drop 110 serves one fiber optic electronic device on subscriber premises 112.

The fiber optic network shown in FIG. 1a can support data, analog video, or voice transmissions, depending on the type of fiber optic electronic device 150 in central office 100. For voice, video, or data transmission, a plurality of optical line terminals would be connected to the plurality of primary fiber optic strands 102a in cable 102.

Figure 1B:
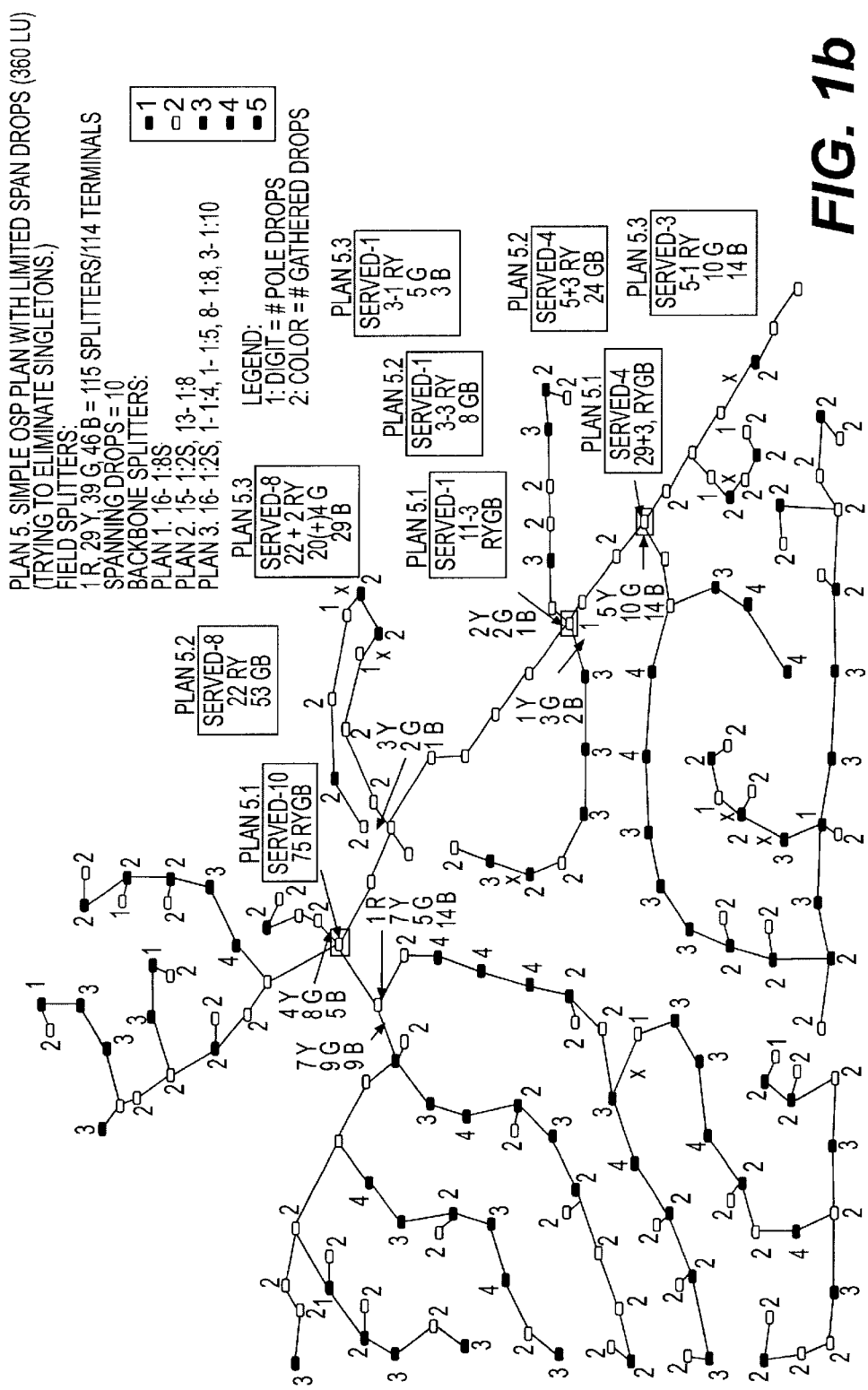
FIG. 1b is a schematic diagram of a fiber optic network, showing the deployment to individual subscriber premises.

FIG. 1b illustrates a typical fiber optic deployment using the system and method of the present invention. As shown in FIG. 1b, fiber optic media is deployed from the central office to various houses within a community of subscribers. Primary fiber optic cable from the central office enters the community at three hub locations. At these locations, the primary strands are split and diverted to individual branches. Along the branches, multiple number of terminals are present. Each terminal location along these branches indicates the number of drops leading to individual fiber optic electronic devices at subscriber locations.

The following example, illustrated in FIG. 1a, shows the distribution of fiber optic strands to individual subscribers. For simplicity, consider one primary fiber optic strand 102a extending from the central office fiber optic electronic device 150. Primary fiber optic strand 102a goes through one 1×8 distribution splitter 104, resulting in eight separate secondary fiber optic strands 106a. These eight secondary fiber optic strands are bundled in secondary fiber optic cable 106. At locations near each service area, secondary fiber optic strands are spliced off the cable and directed toward the intended service area. Once inside the service area, the eight secondary fiber optic strands are routed to local terminals comprising 1×4 splitter-terminal packages. Each 1×4 splitter-terminal package yields four separate fiber optic drops 110, for a total of 32 separate fiber optic drops. In this example, the local terminals are situated between four subscribers, with each subscriber having one fiber optic electronic device. Thus, 32 subscribers each having one fiber optic electronic device, are served from a single primary fiber optic strand from the central office.

Figure 2A:
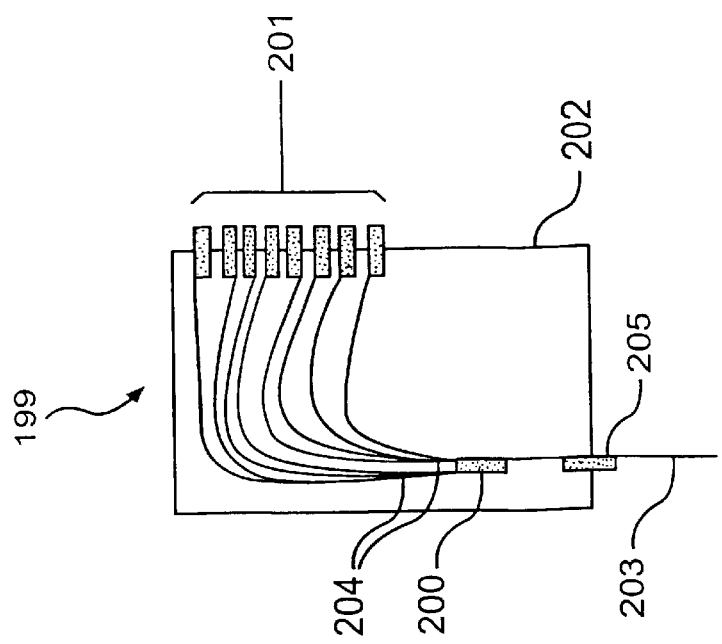
FIG. 2a is a schematic diagram of a splitter-terminal package with a 1×4 splitter and a connectorized termination for the incoming fiber optic strand.

To enable fiber optic deployment to the subscriber premises, the local terminals comprise fiber optic splitter-terminals separating the secondary fiber optic strands into separate signals to be delivered to individual subscribers. As shown in FIG. 2a, the preferred embodiment of the splitter-terminal apparatus is a splitter-terminal package 199 that includes a splitter 200, a plurality of outgoing connectorized terminations 201, and a housing 202. Connectorized terminations 201 could be made with any number of connection fittings known in the art, e.g., SC connectors or ST connectors. Splitter 200 receives incoming fiber optic strand 203 and splits the strand into a plurality of single fiber optic strands 204. Single fiber optic strands 204 connect to the plurality of outgoing connectorized terminations 201. Splitter 200 and connectorized terminations 201 are attached to housing 202 to maintain a fixed distance between the components and to provide strain relief to the delicate fiber optic stands enclosed within housing 202.

The capacity of incoming fiber optic strand 203 and the configuration of splitter 200 dictate the maximum number of strands making up the plurality of single fiber optic strands 204. The number of connectorized terminations making up the plurality of outgoing connectorized terminations 201 is equal to the number of lines making up the plurality of single fiber optic strands 204. As an example, splitter 200 could be a 1×4 splitter in which an incoming fiber optic strand 203 is split into four separate strands 204 that connect to four separate outgoing connectorized terminations 201, as shown in FIG. 2a.

In the preferred embodiment of the present invention, incoming fiber optic strand 203 is connected to incoming connectorized termination 205 mounted in the wall of housing 202. In this manner, the present invention is a self-contained splitter-terminal package 199 with connectorized terminations 201 and 205 on each end. Connectorized terminations 201 and 205 enable fiber optic service providers to quickly and easily install the splitter-terminal package 199 between a splice case and a fiber optic drop to a subscriber home.

Figure 2B:
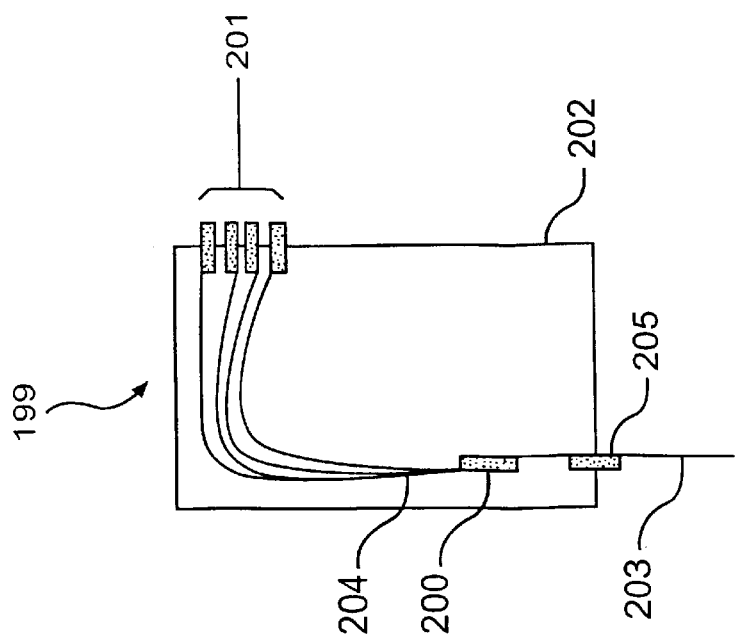
FIG. 2b is a schematic diagram of a splitter-terminal package with a 1×8 splitter and a connectorized termination for the incoming fiber optic strand.
Figure 2D:
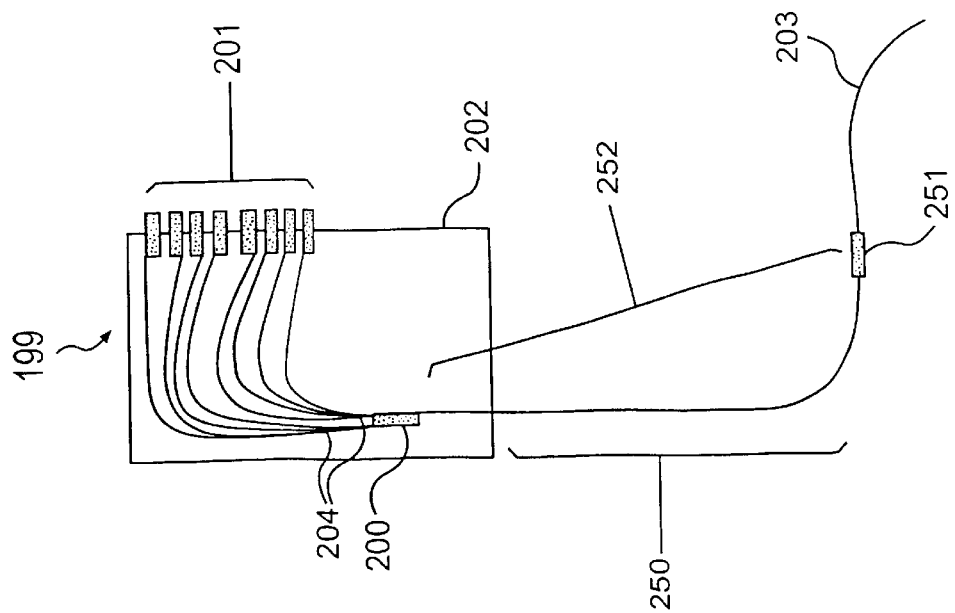
FIG. 2c is a schematic diagram of a splitter-terminal package with a 1×8 splitter and a pigtail for the incoming fiber optic strand.
Figure 2C:
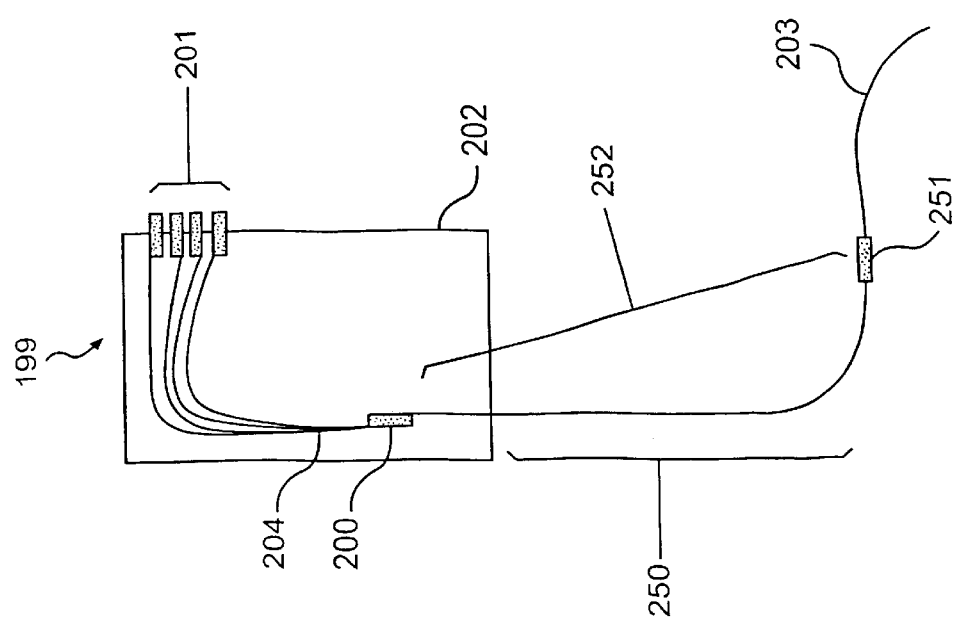

As shown in FIG. 2c, in another embodiment of the present invention, fiber optic strand 252 extends from splitter 200 through housing 202 to connectorized termination 251, forming pigtail 250. In this embodiment, splitter-termination package 199 in FIG. 2c is a self-contained package similar to splitter-termination package 199 in FIG. 2a. However, pigtail 250 provides more flexibility in reaching an adjacent splice case.

Figure 3:
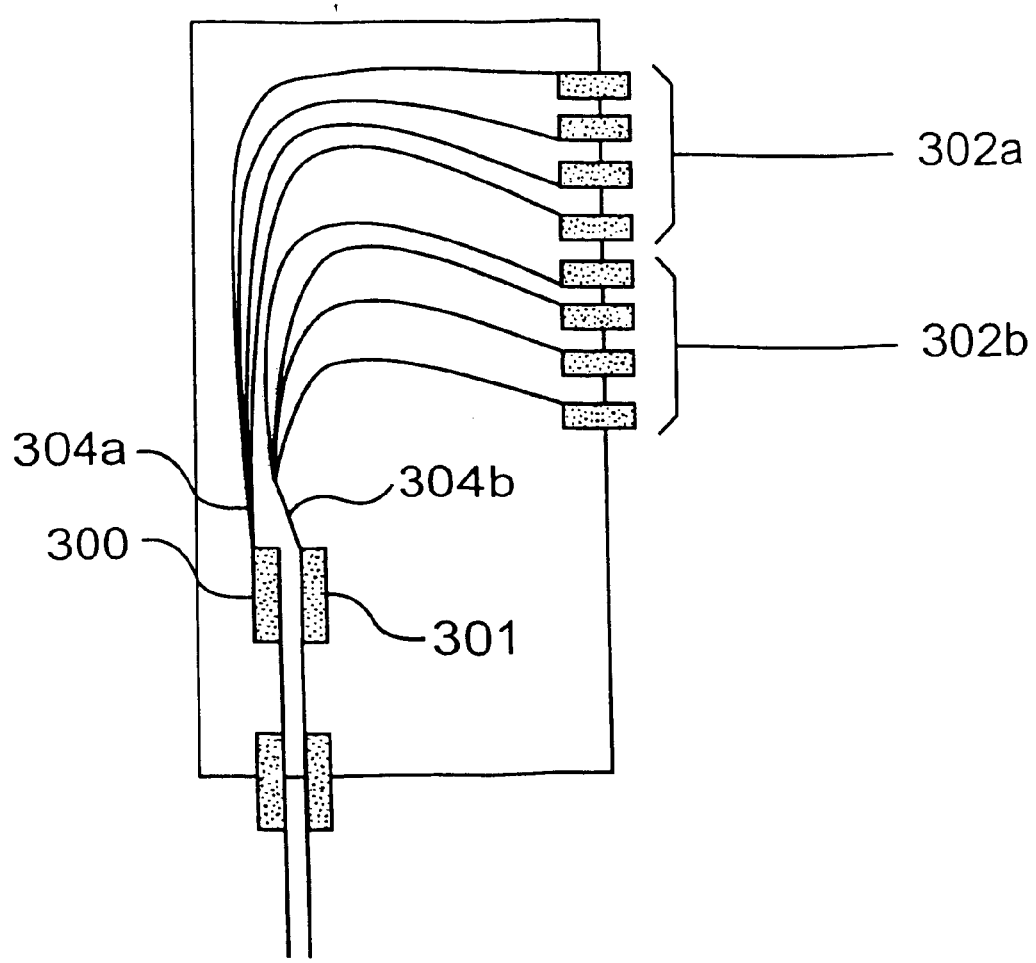
FIG. 3 is a schematic diagram of a splitter-terminal package with two incoming fiber optic strands and two 1×4 splitters.

A splitter-termination package could be arranged in a variety of ways, depending on the capacity of the incoming fiber optic strand and the configuration of the splitter. For instance, instead of the 1×4 splitter shown in FIG. 2a, a 1×8 splitter could be used, thereby requiring eight outgoing connectorized terminations. FIGS. 2b and 2d illustrate this 1×8 configuration with eight strands making up the plurality of single fiber optic strands 204 and eight connectorized terminations making up the plurality of outgoing connectorized terminations 201. Further, to accommodate two incoming fiber optic strands, e.g., one for data and one for video, two splitters could be used to separate the two incoming fiber optic strands. FIG. 3 shows two incoming strands leading into two 1×4 splitters 300 and 301, with two separate pluralities of outgoing fiber optic strands 304a and 304b leading to outgoing connectorized terminations 302a and 302b.

In a further embodiment of the present invention, splitter-terminal package 199 is installed as a component of a larger deployment system, e.g., a pole-mounted aerial system, a strand-mounted aerial system, or a pedestal-mounted system for buried lines. In each deployment example, as shown in FIGS. 4a through 6c, splitter-terminal package 199 is installed between splice case 400 and the plurality of fiber optic drops 403 leading to the subscriber premises.

Figure 4A:
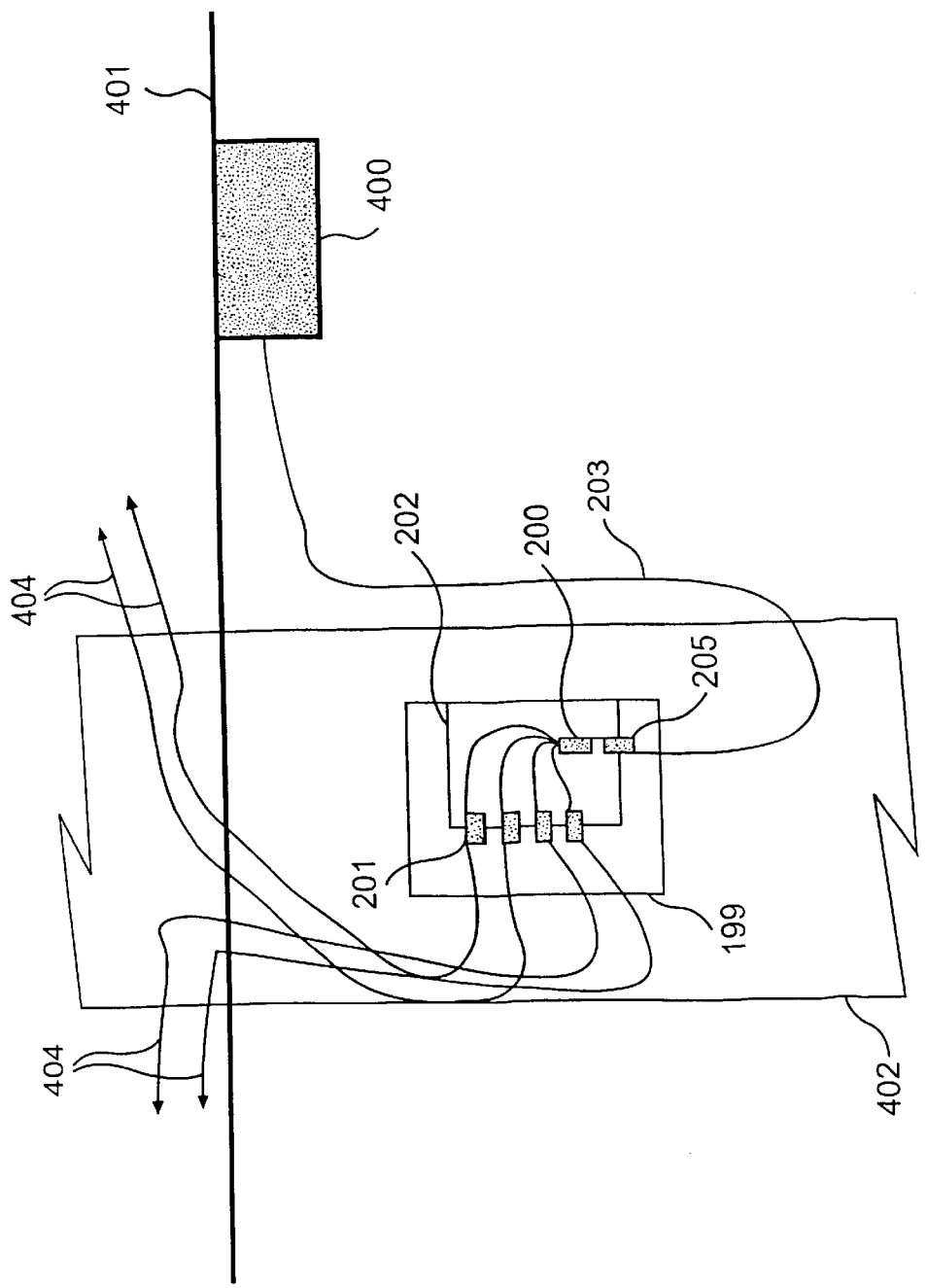
FIG. 4a is a schematic diagram of a pole-mounted splitter-terminal package for an aerial deployment system with a connectorized termination for the incoming fiber optic strand.
Figure 4B:
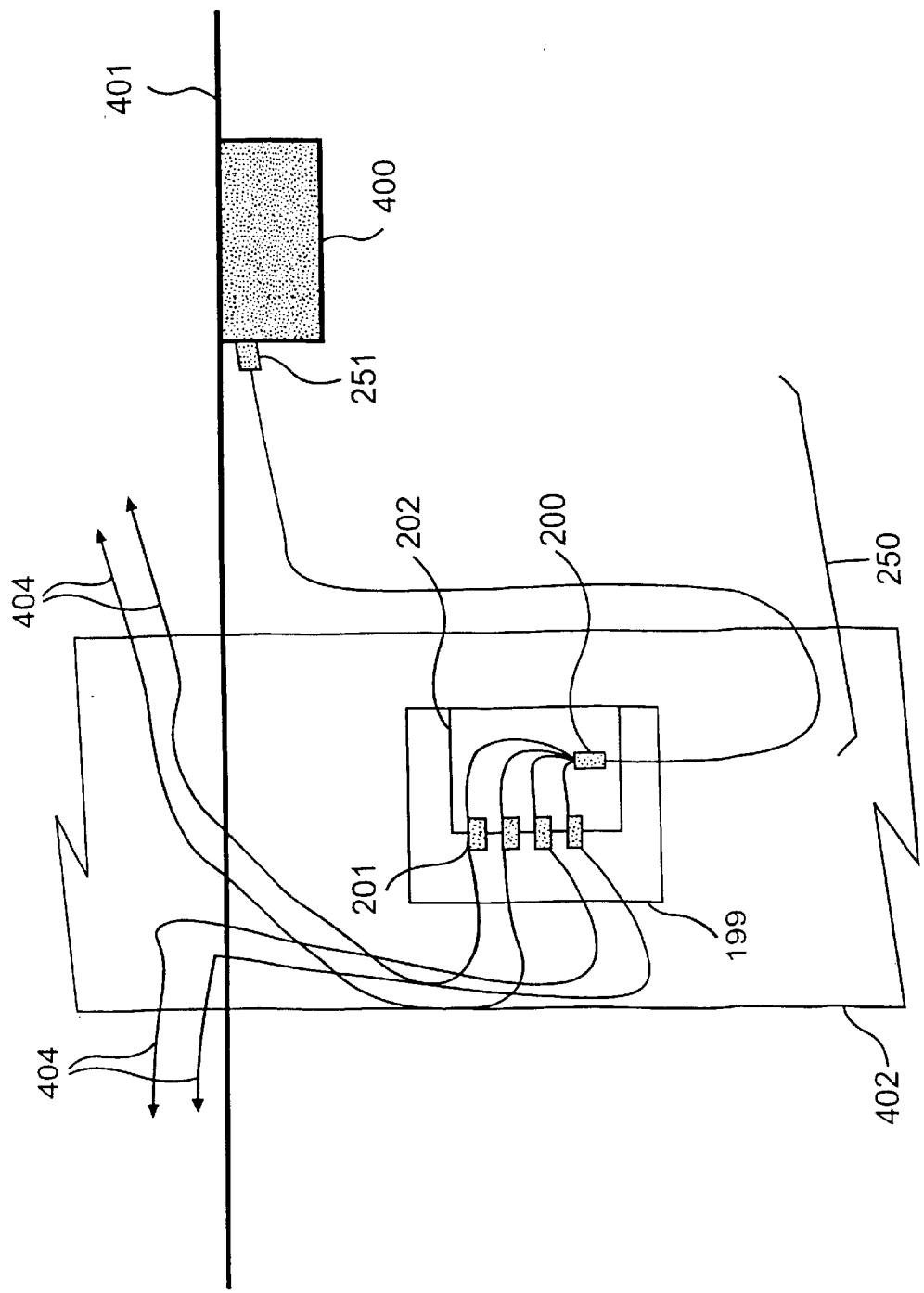
FIG. 4b is a schematic diagram of a pole-mounted splitter-terminal package for an aerial deployment system with a pigtail for the incoming fiber optic strand.

FIGS. 4a and 4b illustrate the use of splitter-terminal package 199 in a pole-mounted aerial deployment system. Splice case 400 connects to and splices fiber optic cable 401, diverting incoming fiber optic strand 203 to splitter-terminal package 199 mounted on pole 402. As shown in FIG. 4a, incoming fiber optic strand 203 connects to splitter-terminal package 199 through connectorized termination 205. In another embodiment as shown in FIG. 4b, incoming fiber optic strand 203 and connectorized termination 205 are replaced by pigtail 250 as described for FIGS. 2c and 2d above. In this embodiment, connectorized termination 251 plugs directly into splice case 400, as shown in FIG. 4b.

To complete the pole-mounted aerial deployment system, the plurality of fiber optic drops 404 connects to the plurality of outgoing connectorized terminations 201. Each fiber optic drop 404 extends to a subscriber premises and terminates at optical network terminals (not shown).

Figure 5:
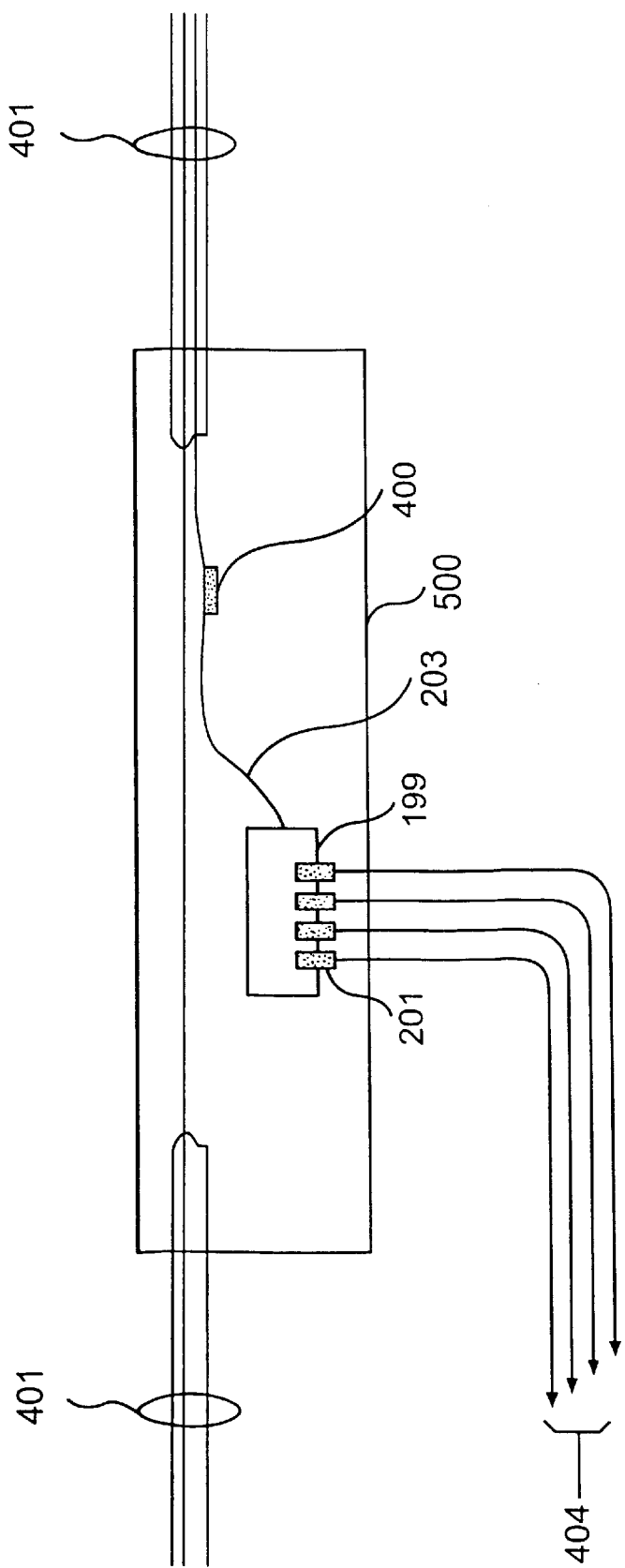
FIG. 5 is a schematic diagram of a strand-mounted splitter-terminal package for an aerial deployment system.

FIG. 5 illustrates the use of splitter-terminal package 199 in a strand-mounted aerial deployment system. Splice case 400 and splitter-terminal package 199 are contained in splice case housing 500. Splice case housing 500 is lashed to fiber optic cable 401 with wire. Splice case 400 connects to and splices fiber optic cable 401, diverting incoming fiber optic strand 203 to the incoming side of splitter-terminal package 199 mounted inside splice case housing 500. On the outgoing side of splitter-terminal package 199, the plurality of connectorized terminations 201 are connected to plurality of fiber optic drops 404.

Figure 6A:
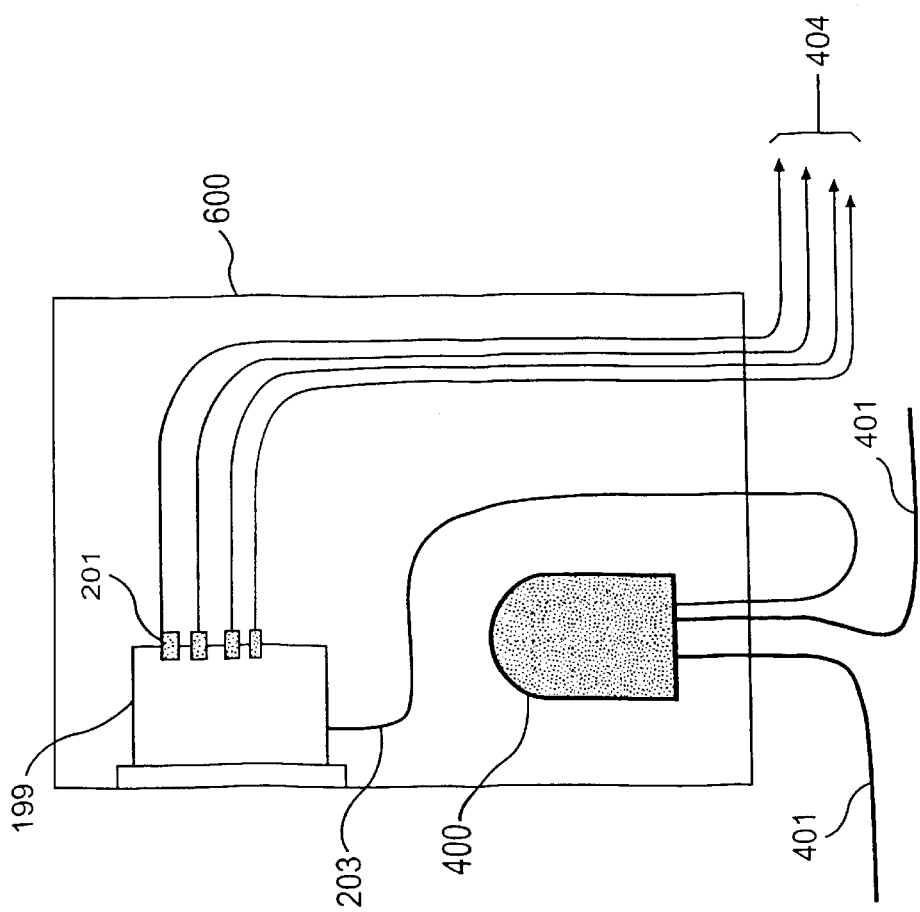
FIG. 6a is a schematic diagram of a pedestal-mounted splitter-terminal package for a buried deployment system with the splice case enclosed in the pedestal shell.
Figure 6B:
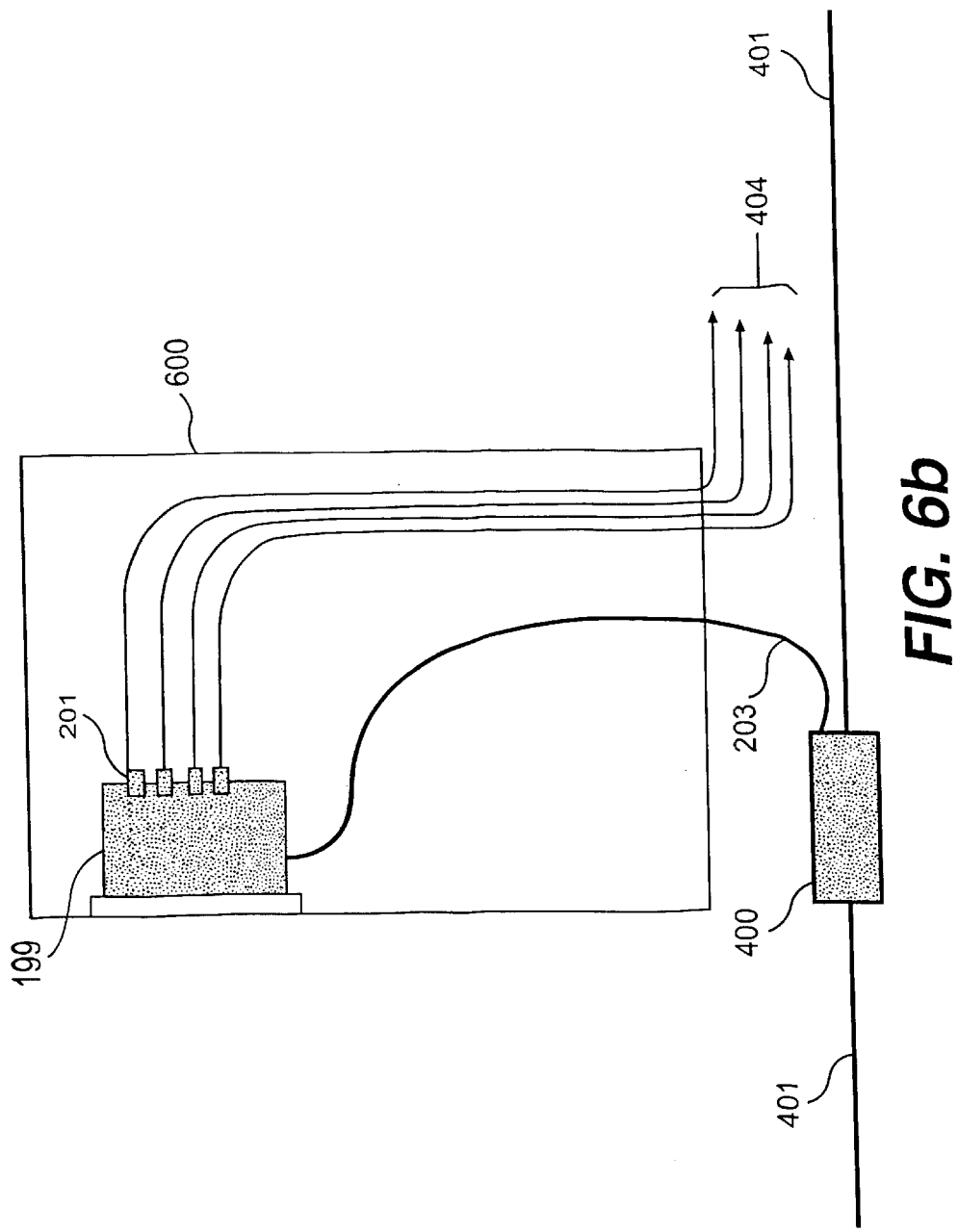
FIG. 6b is a schematic diagram of a pedestal-mounted splitter-terminal package for a buried deployment system with the splice case located separate from the pedestal shell and with the incoming fiber optic cable connected to the splitter-terminal package by a pigtail.
Figure 6C:
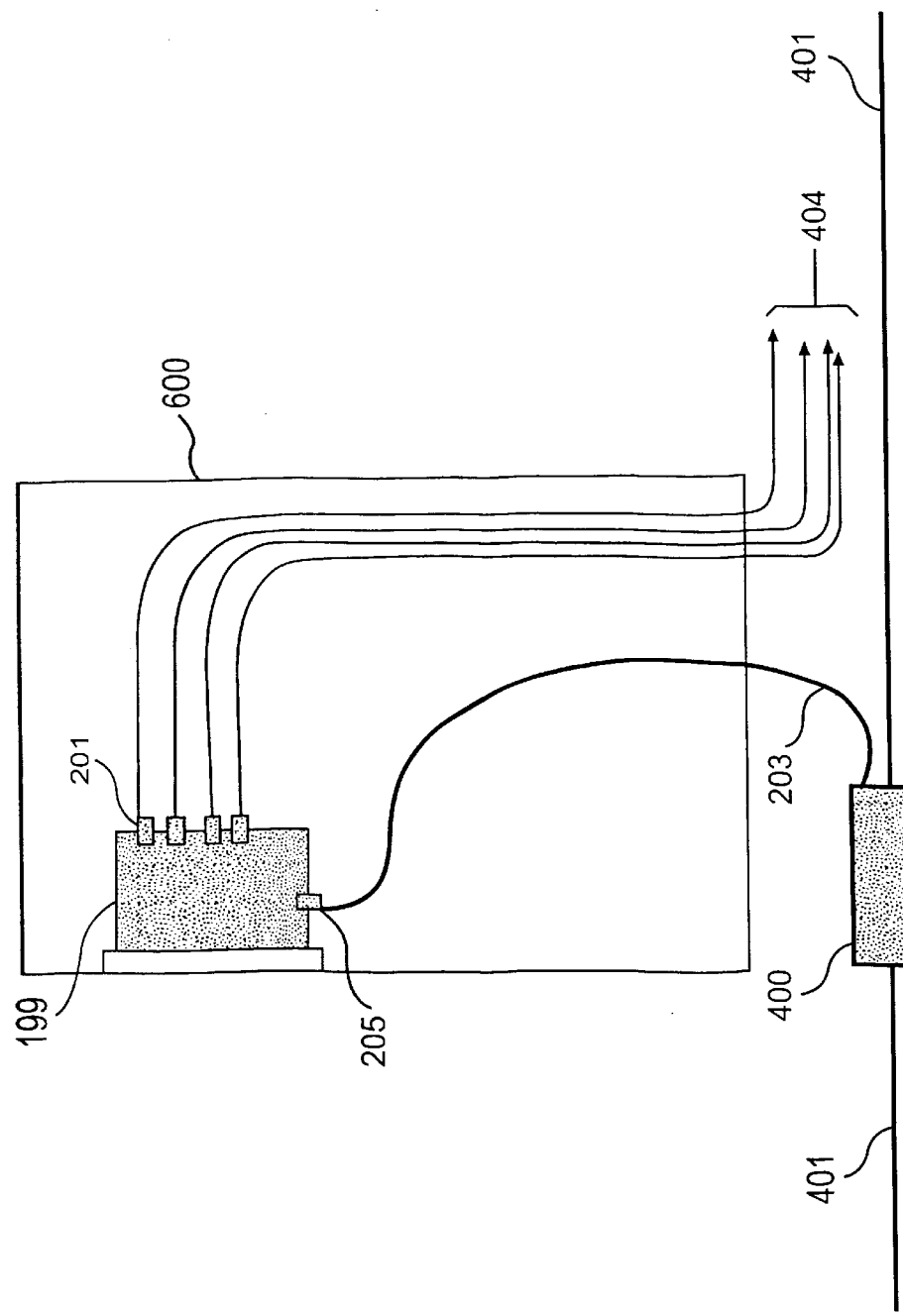
FIG. 6c is a schematic diagram of a pedestal-mounted splitter-terminal package for a buried deployment system with the splice case located separately from the pedestal shell, and with the incoming fiber optic cable connected to the splitter-terminal package with a connectorized termination.

FIGS. 6a through 6c illustrate the use of splitter-terminal package 199 in a pedestal-mounted deployment system for buried lines. In one embodiment, as shown in FIG. 6a, splitter-terminal package 199 and splice case 400 are contained in and mounted on pedestal shell 600. Fiber optic cable 401 enters pedestal shell 600 through the bottom of pedestal 600 and connects to splice case 400. Splice case 400 splices fiber optic cable 401, diverting incoming fiber optic strand 203 to the incoming side of splitter-terminal package 199. On the outgoing side of splitter-terminal package 199, the plurality of connectorized terminations 201 connects to the plurality of fiber optic drops 404. The plurality of fiber optic drops 404 exits pedestal shell 600 through its bottom, travels underground to subscriber premises, and terminates at optical network terminals (not shown).

In another embodiment of the pedestal-mounted deployment, splice case 400 is positioned underground and not inside pedestal shell 600, as shown in FIG. 6b. Splitter-terminal package 199 is housed in and mounted on pedestal shell 600. Splice case 400 connects to and splices fiber optic cable 401 underground, diverting incoming fiber optic strand 203 to pedestal shell 600. Incoming fiber optic strand 203 enters pedestal shell 600 through its bottom. Once inside pedestal shell 600, incoming fiber optic strand 203 connects to the incoming side of splitter-terminal package 199. On the outgoing side of splitter-terminal package 199, the plurality of connectorized terminations 201 connects to the plurality of fiber optic drops 403. The plurality of fiber optic drops exits pedestal shell 600 through its bottom, travels underground to subscriber premises, and terminates at optical network terminals (not shown).

In either the configurations of FIGS. 6a and 6b, incoming fiber optic strand 203 connects to splitter-terminal package 199 with connectorized terminations or is replaced with a pigtail having a connectorized termination on its the end.

At all locations where fiber optic strands penetrate housings, cases or shells, strain relief orifices or fittings well known in the art could be installed to reduce the possibility of damaging the fiber optic strands. Other devices well known in the art, e.g., splice trays, could also be incorporated into the fiber optic deployment systems to provide strain relief and sheath management.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A fiber optic network providing continuous fiber optic service from a central office to a subscriber premises comprising:

(a) a distribution splitter in communication with a first fiber optic electronic device in the central office through a primary fiber optic strand, wherein the distribution splitter optically divides the primary fiber optic strand into a plurality of secondary fiber optic strands;

(b) a splice case connected to one secondary fiber optic strand of the plurality of secondary fiber optic strands, wherein the splice case diverts the one secondary fiber optic strand from the plurality of secondary fiber optic strands;

(c) a housing that receives the one secondary fiber optic strand, the housing containing:
  (i) a local splitter in communication with the one secondary fiber optic strand, wherein the local splitter optically divides the one secondary fiber optic strand into a plurality of local fiber optic strands, and
  (ii) a connectorized termination connected to one local fiber optic strand of the plurality of local fiber optic strands;

(d) a fiber optic drop in communication with the connectorized termination; and (e) a second fiber optic electronic device in communication with the fiber optic drop, wherein the second fiber optic electronic device is located in the subscriber premises, wherein the fiber optic network is passive between the first fiber optic electronic device and the second fiber optic electronic device.

2. The fiber optic network of claim 1, wherein the first fiber optic electronic device comprises an optical line terminal.

3. The fiber optic network of claim 1, wherein the first fiber optic electronic device comprises a video transmitter and an erbium-doped fiber amplifier.

4. The fiber optic network of claim 1, wherein the second fiber optic electronic device comprises an optical network terminal.

5. The fiber optic network of claim 1, wherein the one secondary fiber optic strand is in communication with the local splitter through an incoming connectorized termination.

6. The fiber optic network of claim 5, wherein the housing further encloses the incoming connectorized termination.

7. The fiber optic network of claim 1, further comprising a shell enclosing the housing.

8. The fiber optic network of claim 7, wherein the shell is one of a pedestal enclosure, a pole-mounted enclosure, and a strand-mounted enclosure.

9. The fiber optic network of claim 7, wherein the shell further contains the one secondary fiber optic strand in communication with the local splitter and the splice case connected to the one secondary fiber optic strand.

10. A method of deploying fiber optic cable from a service provider central office to a subscriber premises comprising the steps of:

routing a primary fiber optic strand from an optical line terminal at a central office to a distribution splitter;

optically splitting the primary fiber optic strand into a plurality of secondary fiber optic strands with the distribution splitter;

diverting a secondary fiber optic strand from the plurality of secondary fiber optic strands;

routing the secondary fiber optic strand to a local splitter situated central to a cluster of subscriber premises;

at the local splitter, optically splitting the secondary fiber optic strand into a plurality of local fiber optic strands;

terminating at least one of the plurality of local fiber optic strands with a connectorized termination;

enclosing the local splitter, the plurality of local fiber optic strands, and the connectorized termination in a housing;

connecting a fiber optic drop to the connectorized termination;

routing the fiber optic drop into the subscriber premises; and terminating the fiber optic drop at an optical network terminal located in the subscriber premises, wherein transmissions between the optical line terminal and the optical network terminal are passive.

11. The method of deploying fiber optic cable of claim 10, wherein step of diverting is performed using a splice case.

12. The method of deploying fiber optic cable of claim 10, further comprising the step of enclosing the housing in a shell.

13. The method of claims 12, further comprising the step of enclosing the splice case in the shell.

14. The method of deploying fiber optic cable of claim 7, wherein the step of routing the secondary fiber optic strand to the local splitter comprises connecting the secondary fiber optic strand to the local splitter through an incoming connectorized termination.

15. The method of deploying fiber optic cable of claim 14, further comprising the step of enclosing the incoming connectorized termination in the housing.

* * * * *